2,833,830

3,4,6-TRICHLORO-o-ANOL

Raymond H. Rigterink, Midland, Mich., assignor to The Dow Chemical Company, Midland, Mich., a corporation of Delaware No Drawing. Application April 4, 1956
Serial No. 575,970

1 Claim. (Cl. 260—623)

This invention is directed to 3,4,6-trichloro-o-anol having the structure

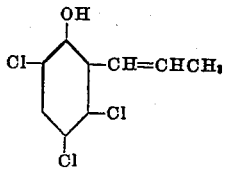

This new compound is a white, crystalline solid soluble in aqueous alkali, and in most organic solvents such as benzene and ethanol, and substantially insoluble in water. It has been found to be valuable as an aphicide and may be employed as an active constituent of compositions for the control of plant pests.

The compound of this invention is conveniently prepared by causing the corresponding allyl compound having the structure

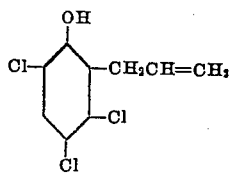

to undergo rearrangement by heating with boiling alkali.

In the preferred method of carrying out this reaction, 2-allyl-3,4,6-trichlorophenol and excess alkali are combined in methanol solvent. The resulting mixture is heated and the temperature increased by gradually distilling most of the solvent. The reaction takes place in the temperature range of from 60° C. to 125° C. with the formation of the alkali metal salt of 3,4,6-trichloro-o-anol. At the end of the heating period, the reaction mixture is cooled, dissolved in water and acidified to precipitate the desired 3,4,6-trichloro-o-anol product. The latter may be recovered by conventional procedures.

In a representative preparation, 118.8 grams (0.5 mole) of 2-allyl-3,4,6-trichlorophenol was dissolved in 125 grams of methanol. 61 grams (0.95 mole) of potassium hydroxide was added to the mixture while the latter was stirred. The mixture was then heated until 56 grams of methanol had distilled. The residue was then heated at 100°–102° C. under reflux for two hours. At the end of this period, the temperature was increased to 125° C. permitting more alcohol to distill. The reaction mixture was then cooled, water added thereto to dissolve the solids, and the resulting aqueous solution acidified with hydrochloric acid to precipitate a 3,4,6-trichloro-o-anol product. The latter was separated by filtration and recrystallized from petroleum ether (having a boiling range of 60° to 70° C.) to obtain a purified 3,4,6-trichloro-o-anol product as a white crystalline compound melting at 65°–67° C.

The 3,4,6-trichloro-o-anol product of the present invention is useful for the control of plant-infesting aphids. For such use, the compound may be applied as a constituent of dusts, aqueous dispersions or emulsions or as a solution in an organic solvent. In a representative operation, 100 percent controls of pea aphids were obtained when said aphids were sprayed with an aqueous dispersion containing as toxic ingredient 0.35 gram of 3,4,6-trichloro-o-anol per 100 milliliters of solvent.

The 2-allyl-3,4,6-trichlorophenol may be prepared by causing the allyl ether of 2,4,5-trichlorophenol to rearrange by heating the ether at the boiling temperature for about 30 minutes.

I claim:
3,4,6-trichloro-o-anol.

References Cited in the file of this patent

Claisen et al.: Chem. Abstracts, vol. 13 (1919), page 2340 (1 page).